J. N. STEVENS.
Water-Filter.
No. 203,566. Patented May 14, 1878.
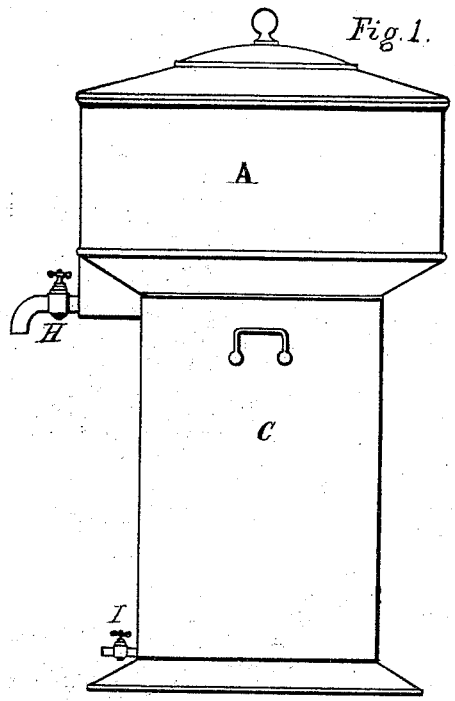
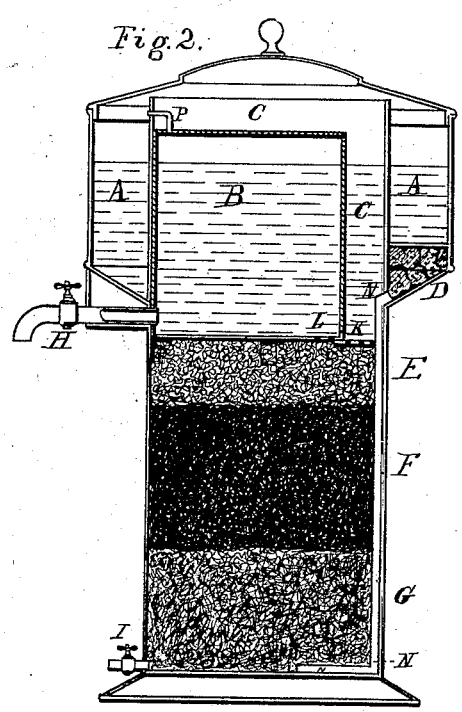
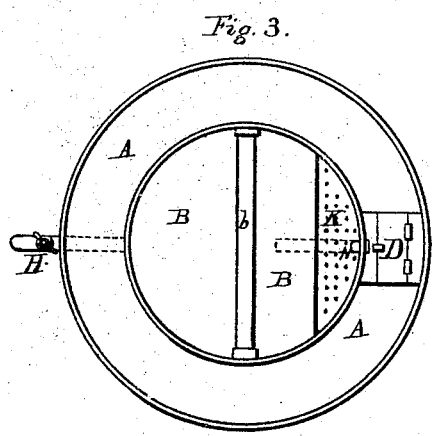
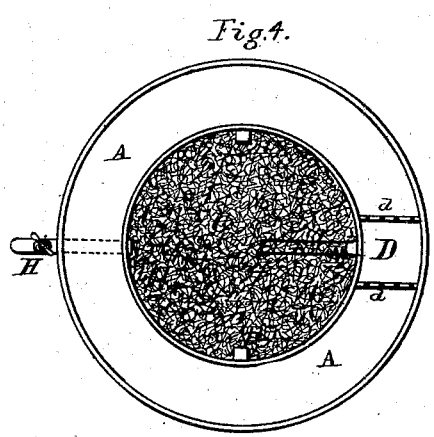
WITNESSES.
J. T. Greer
C. J. Shipley
INVENTOR.
John. N. Stevens

UNITED STATES PATENT OFFICE.

JOHN N. STEVENS, OF TOLEDO, OHIO.

IMPROVEMENT IN WATER-FILTERS.

Specification forming part of Letters Patent No. 203,566, dated May 14, 1878; application filed April 11, 1878.

*To all whom it may concern:*

Be it known that I, JOHN N. STEVENS, of Toledo, in the county of Lucas and State of Ohio, have invented a new and useful Improvement in Water-Filters, which improvement is fully set forth in the following specification, reference being had to the accompanying drawings, of which—

Figure 1 is an elevation. Fig. 2 is a sectional elevation. Fig. 3 is a plan. Fig. 4 is a plan with chamber B removed.

The object of my invention is to facilitate the upward filtration of water, the water having an ascending current, and thus depositing sedimentary impurities on the under side of the filtering material, from which it is easily removed, and the filter cleansed by a reversed current and discharged through faucet I. The water being delivered into the coarse filtering material at the bottom, much of the heavier sediment will naturally tend to precipitate instead of passing upward into the finer material.

The unfiltered water is poured or otherwise deposited in receiving-chamber A, passing thence into sponge-chamber D through perforations $d\ d$, thence into pipe N, thence upward through filtering material G F E in chamber C, through perforations L, into clear-water reservoir B, to be drawn out through delivery-faucet H.

The filtering materials are held in place by holding-down bar $b$, secured at ends, and resting on reservoir B, also by perforated plate K. Air deposited and accumulated in reservoir B is discharged through air-pipe P.

I claim as my invention—

An upward-filtering device, substantially as set forth and described, viz: receiving-chamber A, influent pipe N, discharge-faucet I, perforations L and K, holding-down bar $b$, sponge-chamber D, and perforations $d\ d$, clear-water reservoir B, in combination with delivery-pipe and faucet H, and air-pipe P.

JOHN N. STEVENS.

Witnesses:
   J. T. GREER,
   C. J. SHIPLEY.